UNITED STATES PATENT OFFICE.

JAMES ELIOT BOOGE, OF WILMINGTON, DELAWARE, ASSIGNOR TO E. I. DU PONT DE NEMOURS & COMPANY, OF WILMINGTON, DELAWARE, A CORPORATION OF DELAWARE.

PROCESS OF TREATING BY-PRODUCT ZINC OXIDE.

1,426,349.     Specification of Letters Patent.     Patented Aug. 22, 1922.

No Drawing.     Application filed October 21, 1920. Serial No. 418,391.

*To all whom it may concern:*

Be it known that I, JAMES ELIOT BOOGE, a citizen of the United States, and a resident of Wilmington, in the county of New Castle and State of Delaware, have invented a certain new and useful Process of Treating By-Product Zinc Oxide, of which the following is a specification.

This invention relates to the production of substantially pure zinc oxide from the zinc compound which is formed as a by-product in certain chemical reactions.

In the production of certain organic compounds, as for example benzidine, zinc dust is used as a reducing agent. There is obtained as a by-product from such processes a mixture containing zinc oxide contaminated with organic matter, solvents and certain inorganic impurities such as sodium hydroxide, carbonate, chloride, etc. Before such by-product zinc oxide possesses any value for application for other purposes it must be freed from these impurities.

The present application is directed toward such purification of this by-product zinc oxide as to make it suitable for use as a substantially pure zinc oxide. For this purpose the various impurities must be to a great extent removed, the amounts remaining, if any, being such as to cause no interference in the utilization of the oxide.

My invention may be illustrated by the following example:—

As a first step in the purification, the by-product zinc oxide is calcined at or below red heat, with or without agitation, and in the presence of air, to volatilize or oxidize any organic material or unoxidized zinc which may be present. Residual solvent is of course vaporized, whereas non-volatile organic material is burned out in this treatment. As a second step the calcined zinc oxide, preferably in a finely subdivided state, is washed thoroughly with water. Such washing may be accomplished in a classifier of known construction or by a batch process in suitable tanks by means of successive agitation and decantation. The extent of such treatment should be regulated by tests of the wash water for soluble salts and the treatment continued until no appreciable amount of soluble salts, such as hydroxide, and chloride, of sodium, are being leached out. After each change of water the zinc oxide is well agitated, after which settling is allowed to take place.

With some types of by-product zinc oxide, rapid settling does not occur. The material remains in suspension almost indefinitely, presumably due to assumption of a more or less colloidal state, with adsorption of the ions of the soluble salts still present. This difficulty can be overcome, however, by addition to the wash water of a very small amount of sulphuric acid. In this way the colloidal suspension is coagulated and the oxide settles readily.

The purified oxide can then be filtered in any suitable manner and the filter cake dried. In this manner a substantially pure zinc oxide is produced which is suitable for the numerous well-known applications of this material.

In some cases the calcination step above described may be omitted. Thus where the organic matter associated with the zinc oxide is soluble in a low-boiling organic solvent such as petroleum ether or ethyl alcohol, the crude by-product may be treated with such a solvent to remove the organic matter, the solvent being recovered later by distillation.

After the removal of the organic matter it is not always necessary to remove impurities such as soluble salts which may be present, since for some applications of zinc oxide these impurities may remain without lowering the value of the material.

In general my invention comprises the treatment of by-product zinc oxide, and especially the zinc compound resulting from the use of zinc dust as a reducing agent in organic chemical reactions, to effect the removal of harmful impurities to such an extent that there will remain with the zinc oxide less than 1% of such impurities.

I claim:—

1. The process which comprises calcining by-product zinc oxide, thereby forming a product containing water-soluble compounds, and washing the calcined product with water to remove said soluble salts.

2. The process which comprises calcining by-product zinc oxide containing organic matter to volatilize the latter, and then washing the calcined product until the amount of impurities being leached out is no longer appreciable.

3. The process which comprises removing organic matter from by-product zinc oxide contaminated therewith, and washing the resulting zinc oxide with water to remove any water-soluble compounds which may be present.

4. The process which comprises removing organic matter from by-product zinc oxide contaminated therewith, and washing with water the resulting zinc oxide mixture containing sodium salts until the proportion of sodium salts present is less than 1%.

5. The process which comprises removing organic matter from by-product zinc oxide contaminated therewith, mixing the zinc oxide with water to extract any water-soluble compounds present, adding a small amount of a mineral acid to cause coagulation of any zinc oxide which shows a tendency to remain in suspension, allowing the zinc oxide to settle, and then separating the zinc oxide from the solution.

In testimony whereof I affix my signature.

JAMES ELIOT BOOGE.